United States Patent [19]

Alles et al.

[11] 4,211,012

[45] Jul. 8, 1980

[54] ELECTRIC-SIGNAL CONTROLLED HAND-HELD PRINTER

[75] Inventors: Harold G. Alles, Bridgewater; Peter S. Kubik, South Plainfield, both of N.J.

[73] Assignee: Bell Telephone Laboratories, Incorporated, Murray Hill, N.J.

[21] Appl. No.: 889,267

[22] Filed: Mar. 23, 1978

[51] Int. Cl.[2] .......................... B41J 3/04; G01D 15/24

[52] U.S. Cl. .................................... 33/18 R; 33/27 L; 15/3; 118/211; 346/143; 354/348; 400/19; 400/121; 401/193; 401/194

[58] Field of Search ...................... 400/18, 19, 20, 121, 400/125, 125.1; 33/18 R, 27 R, 27 L; 118/211; 354/348, 350; 346/141, 143; 15/3; 401/193, 194, 209

[56] References Cited

U.S. PATENT DOCUMENTS

| | | | |
|---|---|---|---|
| 222,616 | 12/1879 | White | 354/348 |
| 241,302 | 5/1881 | Clifford | 354/348 |
| 516,212 | 3/1894 | Lewis | 346/143 |
| 2,095,851 | 10/1937 | Aimes | 33/27 L |
| 2,147,668 | 2/1939 | Pfeiffer | 346/141 |
| 2,337,341 | 12/1943 | Miller | 33/18 R |
| 2,428,378 | 10/1947 | Mossbach | 346/143 |
| 2,512,786 | 6/1950 | Borg | 33/27 R |
| 2,579,290 | 12/1951 | Bachmann | 33/27 L |
| 2,807,236 | 9/1957 | Wolf | 33/18 R |
| 2,936,207 | 5/1960 | Beaumont | 346/141 |
| 3,148,451 | 9/1964 | Morris | 33/18 R |
| 3,209,365 | 9/1965 | Fasola | 346/141 |
| 3,297,003 | 1/1967 | Benson | 15/3 |
| 3,376,551 | 4/1968 | Armbruster | 346/143 |
| 3,543,279 | 11/1970 | Rempel | 346/141 |
| 3,686,681 | 8/1972 | Stegenga | 346/141 |
| 3,824,603 | 7/1974 | Bates | 346/141 |
| 3,844,253 | 10/1974 | Staub | 33/18 R |
| 4,003,459 | 1/1977 | Moffatt | 400/18 |

FOREIGN PATENT DOCUMENTS

| | | | |
|---|---|---|---|
| 1913947 | 10/1970 | Fed. Rep. of Germany | 15/3 |
| 699017 | 10/1953 | United Kingdom | 33/18 R |

*Primary Examiner*—Clyde I. Coughenour

*Attorney, Agent, or Firm*—Charles S. Phelan

[57] ABSTRACT

A character applying device which is controlled by a separate signal processor can be manually moved across a writing surface while the characters are being applied. A single-tipped marking instrument is moved with a prescribed motion parallel to the surface as the device is moved across the surface to create a relatively dense array of line patterns. Simultaneously, received control signals cause the tip to move in and out of contact with the surface for, in effect, masking the array to produce characters represented by those signals.

3 Claims, 13 Drawing Figures

ELECTRIC-SIGNAL CONTROLLED HAND-HELD PRINTER

BACKGROUND OF THE INVENTION

1. Field of the Invention

This invention relates to recording instruments, and more particularly to devices and methods for applying characters to a surface.

2. Description of the Prior Art

Due to the innovations of modern technology, it is now possible and practical to store alpha-numeric data in a variety of ways other than the standard approach using printed memoranda on a paper recording medium. Examples of such storage techniques include magnetic tape recorders, computer disc files, and semiconductor memories in computers and calculators. In order to use data stored in these ways, it is often necessary to have a way to reduce the data to humanly readable form. Methods for accomplishing this important task include the use of television screens (as are often used in airports for plane schedule monitors), teletypewriters, ticker tape machines, "X-Y" plotters, and also movable printers that apply the data characters to a writing surface as the printer is drawn across the surface. Two types of such movable printers known in the prior art are the matrix print head rolling printer and the ink jet moving printer.

One matrix print head rolling printer is described "Selectable Area Television Printer/Plotter" by S. Kambic, *IBM Technical Disclosure Bulletin,* Vol. 17, No. 2, July 1974, pages 565–567. That printer uses a printing mechanism in which many marking tips are arranged in a rectangular array. These tips are separately controlled in their vertical movement with respect to the printing surface so as to approximate any alpha-numeric symbols when they strike the surface in a variety of patterns as the printer is rolled across the surface. Although this matrix approach is suitable for its purpose, it is relatively complex and expensive.

An ink jet moving printer is shown in U.S. Pat. No. 3,656,169 to T. Kashio and has an ink depositing mechanism which controls an electrostatically charged stream of ink with deflection electrodes in a manner similar to the technique for controlling an electron beam in a cathode ray tube. Responsive to the changing voltage levels on the control electrodes, the stream of ink traces out characters on a printing surface as the printer is being moved across the surface. The ink stream control mechanism of this type of printer is useful for some applications, but it is a costly precision device requiring fine alignment and adjustment.

Objects of the present invention include simplifying movable printers and rendering them more reliable and less costly movable printers than those of the prior art.

SUMMARY OF THE INVENTION

The invention is directed to a movable printer employing a single-tipped marking device which is driven with a prescribed motion parallel to a writing surface as the printer is being moved across the surface. The contact of the tip of the marking device with the writing surface is controlled by a print control actuator which is responsive to received signals defining information to be printed.

It is one feature of the invention that an indexing mechanism is coupled to one of the printer wheels. This indexer provides an indication of the extent of displacement of the printer as it moves across the writing surface so that information characters being applied will be properly spaced.

In one embodiment of the present invention, the marking tip is oscillated essentially parallel to the writing surface and perpendicular to the direction of motion of the printer across the surface. The combination of the oscillations and printer motion thus cause the marking tip to describe a set of almost vertical closely spaced lines as the printer moves across the surface. Easily readable characters are generated by controlling the tip contact with the surface and thereby appropriately interrupting those lines.

In another embodiment of the instant invention, the marking tip is moved in a circular pattern parallel to the writing surface as the printer is moved across the surface. A set of partially overlapping almost circular loops are thus traced out on the writing surface. The actuator raises the tip off the writing surface to interrupt the loops at appropriate times to print a desired pattern of characters. A desirable feature of this embodiment is that the almost circular patterns are generated with less lateral mechanical vibration than in the first-mentioned embodiment.

With both embodiments, easily distinguishable characters are produced in a reliable and relatively inexpensive manner.

A feature of the instant invention is that it may employ one of a broad variety of marking devices (e.g., a ball-point pen tip, an oscillating wire-end "hammer" striking through an inking ribbon, a felt-tipped marker, a nylon-tipped marker, a brush tip, etc.).

Another feature of this invention is that it may be adapted for the use of more than one type of writing medium (e.g., ink, paint, pencil lead, chalk, etc.).

Yet another feature of the instant invention is that it may be adapted to apply characters to various writing surfaces such as paper, wood, leather, glass, concrete, etc.

DETAILED DESCRIPTION

Figure 1:
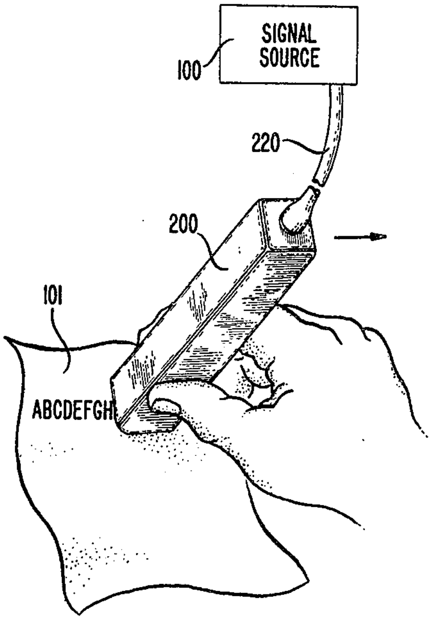
FIG. 1 shows a manner in which the invention is used for applying characters to a surface.

FIG. 1 shows a hand-held version of the invention. In this figure a printer 200 is responsive to signals received through a cable 220 from a source 100 for applying characters to a surface 101. Source 100 is advantageously a portable calculator programmed to perform predetermined well-known forms of logic operations of types to be outlined. Such a calculator supplies data directly from its own operations or from an internal store loaded from those operations or from an external source. For example, the calculator can be acoustically or electrically coupled to a telephone station set to load that internal store from a callable remote data source.

Figure 2:
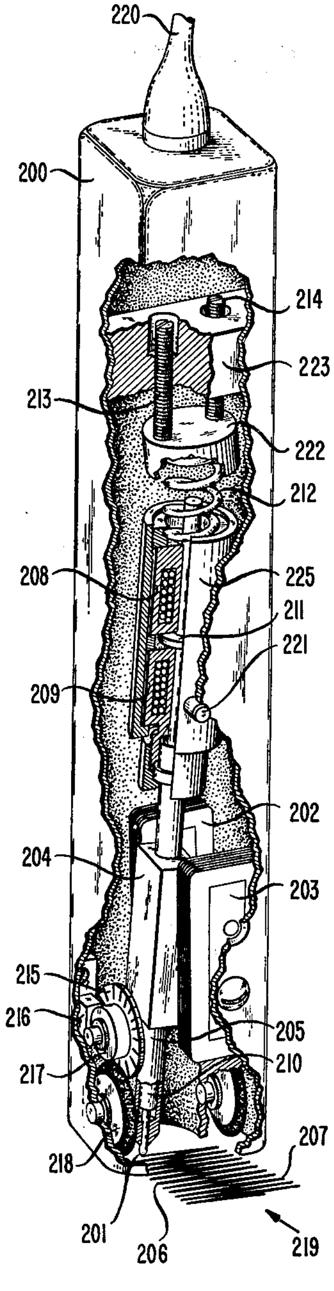
FIG. 2 shows one embodiment illustrative of the invention wherein the marking tip is caused to vibrate along a direction perpendicular to the direction of motion of the printer.

FIG. 2 shows an embodiment of the invention in which a marking tip 201 of any appropriate type is caused to oscillate essentially parallel to the writing surface 101 in a direction perpendicular to the horizontal motion as depicted by arrow 219 of the printer 200 across the surface. A pair of field coils 202 and 203 are energized from source 100 by way of wires (not separately shown) through cable 220. Those coils are thus provided with a constant frequency alternating current, and the resulting magnetic field causes a permanent magnet 204 to be vibrated back and forth. A guide tube 205 extends through, and is secured to the magnet 204. The marking tip 201 is secured to a shaft 210 which passes through the tube 205 and is secured to a magnetic disc 211 in an electromagnetic actuator. Tip 201 has a close sliding fit in the lower end of tube 205.

The actuator includes two solenoids 208 and 209 within a housing 225 to which are secured pivots, such as the pivot 221, rotatably mounted in the printer 200 outer housing. Tip shaft 210 advantageously extends through both solenoids, and the disc 211 extends into a space between those solenoids so that the shaft and disc are free to move to a limited extent in a direction parallel to the length of the shaft. Guide tube 205 is secured to solenoid housing 225. Thus, the assembly including housing 225, tube 205, and tip 201 swings as a unit on the pivots 221 as the magnet 204 is driven back and forth.

Figure 3A:
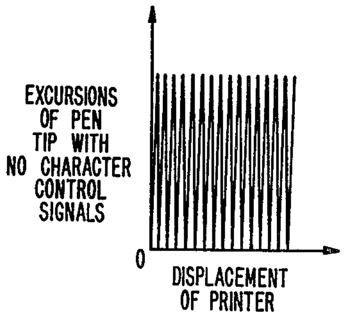
FIGS. 3A through 3F depict printer traces and control signal traces illustrating the operation of the embodiment of FIG. 2.

As tip 201 reciprocates, it makes an oscillatory trace on surface 101 between limiting positions 206 and 207. A similar trace for no character control signals is shown in FIG. 3A. The extent of excursion between those positions is determined by a coil spring 212 which engages a shoulder in the upper end of housing 225 and nominally has a longitudinal axis approximately colinear with the longitudinal axis of the tip driving apparatus. Spring 212 is held under adjustable compression by a cap 222 engaging the upper end thereof to provide a limited toggle function. The cap and spring are held in position by two screws 213 and 214 which are in threaded engagement with a head member 223 secured to the housing of printer 200. Those screws are on an axis perpendicular to the axis of pivotal motion. When the screws are adjusted to cause compression or allow extension of spring 212, the extent of the arc through which the upper end of housing 225 can move is correspondingly shortened or lengthened. Consequently, the distance between limiting positions 206 and 207 is similarly shortened or lengthened. Since two screws are employed, the cap 222 can be held in a tilted position to bias the path described by tip 201. For example, in one application the bias was made sufficient to require electromagnetic drive power in only alternate half cycles of the tip sweep leaving the intermediate half cycles to be return powered by spring 212.

In an embodiment for printing characters of about the size of conventional typewriter type, the distance from pivot 221 to the surface 101 was about three inches. Consequently, there was no substantial difference in trace density on surface 101 between the central and end regions of sweep.

Solenoids 208 and 209 are alternatively energized from source 100 by control signals transmitted by wires (not shown) through cable 220. Those signals cause the marking tip shaft 210 to move up or down within the guide tube, hence causing the marking tip to move in or out of contact with the writing surface 101. This has the effect of partially masking recurrences of the tip pattern trace to produce desired information characters. The disc 211 serves as a pole piece for the solenoids 208 and 209. When solenoid 208 is energized it creates a magnetic field which causes the magnetic disc 211 and marking tip shaft 210 to which it is attached to be pulled up so that the marking tip 201 is out of contact with the writing surface. When solenoid 208 is unenergized, solenoid 209 is energized; and the magnetic disc 211 and the shaft 210 are pulled down so that the marking tip 201 contacts the writing surface.

Fine adjustment of the height of tip 201 is advantageously effected by adjusting the positions of wheels 218 on the housing of printer 200. When properly adjusted, tip 201 is in stable marking engagement with surface 101 while solenoid 209 is energized but before disc 211 has moved downward sufficiently to be held against that solenoid. In applications where tip 201 is a wire-end "hammer", the energizing signals for solenoid 209 have an oscillatory signal superimposed thereon to cause the tip to make a series of dots rather than tracing a continuous line.

Figure 3B:
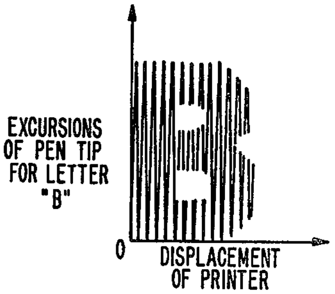
Figure 3C:
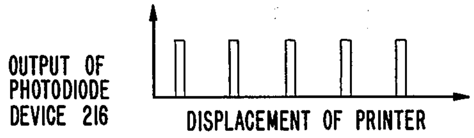

In order to synchronize the up and down motion of the marking tip with the motion of the printer across the writing surface, it is necessary to have an indexing mechanism which produces a signal indicating the linear displacement of the printer. Such an arrangement is shown as elements 215 through 218 of FIG. 2. A photodiode electronic switching device 216 is used to sense the rotation of a slotted disc 215 which is to be driven by a guide wheel 218 through an idler wheel 217. In this manner the displacement of the printer is measured in small steps as shown in FIG. 3C where the pulses indicate passage of a slot in disc 215 past the device 216. This displacement information is transmitted from device 216 by wires (not separately shown) in cable 220 to signal source 100 which receives it as an input signal to be used in combination with the stored data signals to generate control signals for the solenoids 208 and 209 in order to properly position the marking tip 201 as the printer 200 is moved across the marking surface 101. Consequently, as the solenoids 208 and 209 are energized, the stored characters are applied to the writing surface. An illustrative character "B" is shown in FIG. 3B.

Various logic arrangements can be employed in source 100 for providing the solenoid control signals in response to the printer displacement index signals of FIG. 3C. For example, a character field can be considered to be divided into rows and columns of area units, e.g., $7\times14$ units. For each field the vertical coordinates correspond to units of time for a single sweep in either direction by tip 201, and the horizontal coordinates represent units of displacement of the printer relative to the surface as presented by index signals of FIG. 3C. A table is constructed in memory for the anticipated character set and having in each bit position a bit indicating by its binary signal state which of solenoids 208 or 209 is to be energized for a particular unit area of a particular character. Then by counting sweep time units and character field index pulses, and combining those counts with data signals representing respective characters, the successive address signal sets are produced to address the table to read out the respective solenoid control signals for each segment of each pattern traced by tip 201.

Figure 3D:
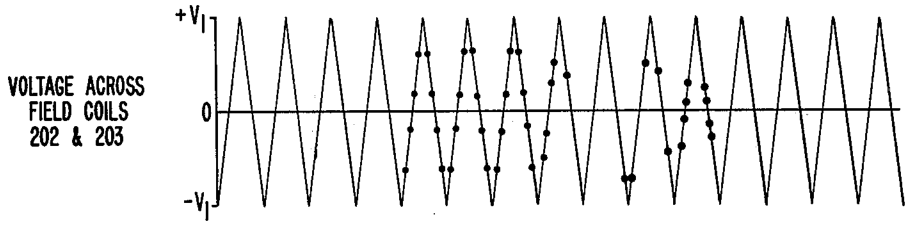
Figure 3E:
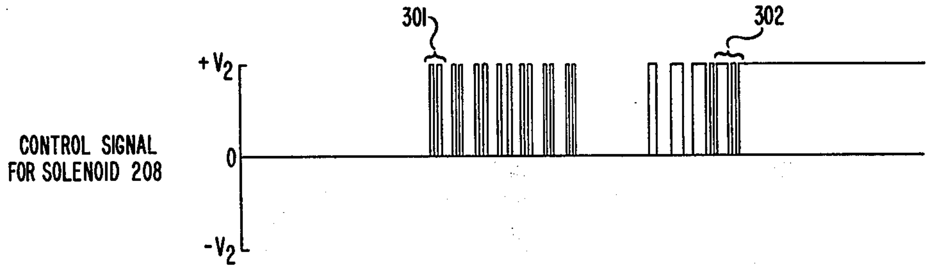
Figure 3F:
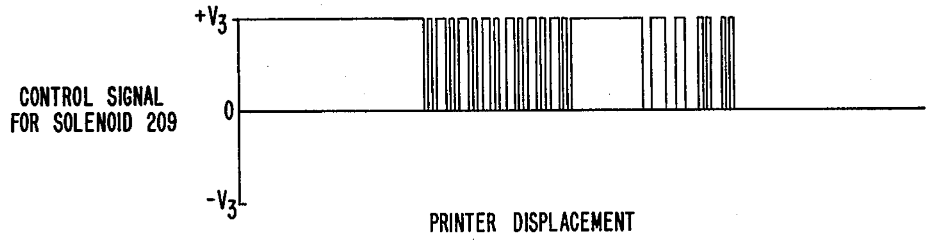

FIGS. 3D through 3F show a typical set of control signals for generating the letter "B" with the embodiment of FIG. 2. FIG. 3D shows the triangular-waveform field coil voltage which causes the guide tube 205 to oscillate as previously described. FIG. 3E shows the marking tip "pickup" control signals for pickup control solenoid 208. FIG. 3F shows the marking tip "print" control signals for solenoid 209. The dots on the waveform in FIG. 3D show the points at which the marking tip is raised or lowered to produce the "B" of FIG. 3B. It should be noted that these two solenoid control signals are complementary so that the marking tip is constrained to be in either a "pickup" or "print" position. Considering FIGS. 3B through 3F together, the correlation is evident. For example, in FIG. 3E the pulse pair 301 corresponds to the two tip-lift operations as tip 201 makes its first sweep up through a portion of the letter "B" involving the two internal openings in that letter. Similarly, the FIG. 3E signal excursions 302 represent the sweep of tip 201 to define the right-hand edge of the character of FIG. 3B.

Figure 4:
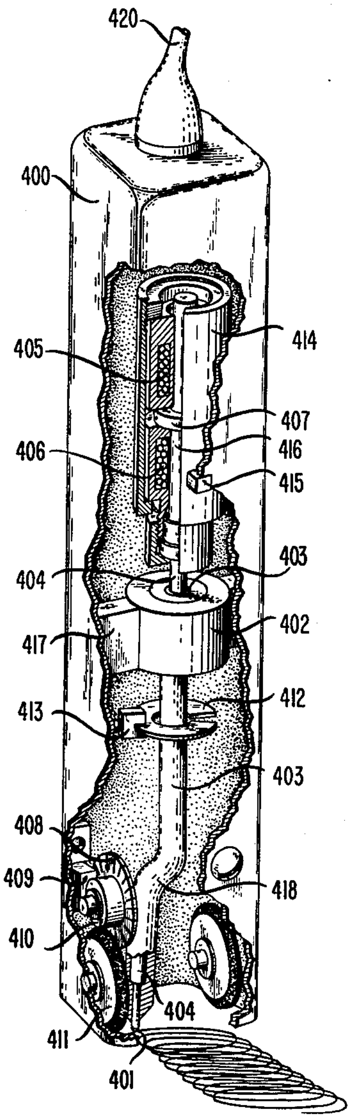
FIG. 4 shows another embodiment of the invention in which the marking tip is spun in a circular pattern as the printer moves across the writing surface.
Figure 5A:
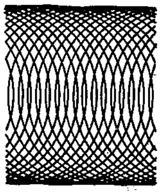
FIGS. 5A through 5D depict printer and control signal traces illustrating operation of the embodiment of FIG. 4.
Figure 5B:
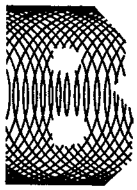
Figure 5C:
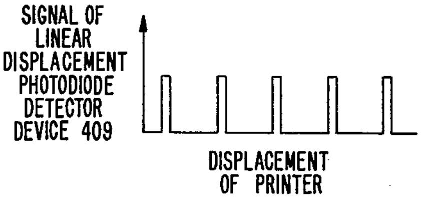

FIG. 4 shows a second embodiment of the invention in which a marking tip 401 for a printer 400 is caused to revolve in a circular motion parallel to the writing surface 101 as the printer is rolled across the surface. This embodiment is characterized by less lateral vibration than is the embodiment of FIG. 2. FIG. 5A illustrates a typical trace with no character information. In the FIG. 4 embodiment, signals are coupled between source 100 and printer 400 by way of a cable 420 as before. Similarly, a linear indexing arrangement including a photodiode detector device 409 cooperating with a slotted disc 408 driven through an idler wheel 410 from a printer wheel 411 provides signals to source 100 indicating printer displacement as shown in FIG. 5C. Also, the tip 401 is coupled through a shaft 404 extending through a guide tube 403, to a magnetic disc 407 that is actuated by lift and print signals applied from source 100 to solenoids 405 and 406. In this embodiment shaft 404 is flexible for a reason to be discussed. Solenoid housing 414 is mounted to the printer housing by way of square supports such as the support 415 to represent a rigid relationship in this embodiment between the solenoids and the printer housing.

Rotation of tip 401 is achieved by having the guide tube 403 secured to the armature of an electric motor 402 that is fixedly mounted by a bracket 417 to the housing of printer 400. For example, in an embodiment using a fine shaft 404 or a wire-end "hammer" type of marker, the motor 402 is advantageously a No. 2112-N903 type of motor manufactured commercially by the HICO Horizons International Co., of Menlo Park, California. The motor is energized for continuous operation by direct current supplied from source 100 by way of cable 402.

In FIG. 4, the guide tube 403 has a dog-leg bend 418 in the lower portion thereof to place tip 401 at an appropriate offset, i.e., one half of character height, from the axis of rotation of the tube 403. Tip shaft 404 extends through the tube 403 and the armature of motor 402. As shown in FIG. 4, tube 403 is substituted for the motor drive shaft to facilitate the mentioned arrangement of shaft 404. Shaft 404 is advantageously coupled to the lower end of a further shaft 416 supported in bearings in the solenoid housing 414 and secured to disc 407. In some applications, rotation of tube 403 by motor 402 simply deflects the lower portion of shaft 404 without actually causing that shaft and shaft 416 and disc 407 to rotate, except as to relative angular displacement between shaft 404 and tube 403. However, in other applications as the motor 402 drives tube 403 in rotation, tip 401 and shafts 404 and 416 are correspondingly driven through the engagement of shaft 404 with tube 403 at the dog-leg bend 418.

Energization of solenoids 405 and 406 actuates disc 407 to drive the shafts 416 and 404 and the tip 401 up and down within tube 403 to be either out of or in marking engagement with the marking surface 101. In applications where shaft 404 rotates with tube 403, the coupling for disc 407 to shaft 416 should be made through thrust bearings (not shown) to permit the vertical drive function without risking rotational dragging of disc 407 on the solenoids.

Figure 5D:
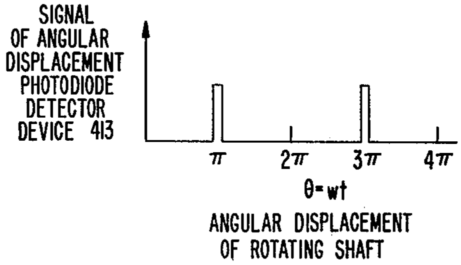

In order to facilitate production of the solenoid control signals for FIG. 4, an additional indexing arrangement is provided to supply source 100 with angular position information regarding tip 401. To this end a photodiode detector device 413, mounted on the printer housing, cooperates with a single-slot disc 412 secured to rotate with tube 403. Any predetermined angular orientation of the slot with respect to the position of bend 418 is satisfactory. On each complete rotation, device 413 produces one pulse to source 100 as shown in FIG. 5D. Logic in source 100 uses those signals in cooperation with the linear displacement signals of FIG. 5C to determine, in a manner analogous to that already described in connection with FIGS. 2 and 3B–3F, when to produce lift signals and print signals for the solenoids. However, in the case of the FIG. 4 embodiment, the storage of solenoid control signals is advantageously predistorted to reflect the fact that tip 401 is moving in a circular fashion instead of a linear reciprocating fashion. The angular index pulses of FIG. 5D are used with at least the field vertical coordinate time counting to provide tip time position information. Also the horizontal coordinate set is split into two subsets to reflect the fact that the basic tip pattern is nonlinear, and symmetrical in this case, so that the tip follows a different path in each half of a full pattern cycle. Traces for a letter "B" produced in manner of FIG. 4 are shown in FIG. 5B.

While the invention has been explained and described with reference to two particular embodiments thereof, other realizations will be apparent to those skilled in the art without departing from the spirit and scope of the invention.

We claim:

1. An electrical signal responsive printer for marking information characters represented by received electric signals on a predetermined surface as said printer is moved across such surface, said printer comprising a marking device, electromagnetic motor means for moving said device to trace a recurrent pattern in a plane parallel to the plane of said surface, said motor means including means for generating an alternating magnetic field, and a magnetic member coupled to said marking device and mounted in said field to be driven thereby in linear reciprocating motion, means, responsive to said received electric signals, for actuating said device into or out of marking engagement with said surface to interrupt selectable parts of successive markings of said pattern on said surface for thereby forming said characters, and means for limiting the extent of said reciprocating motion, such limiting means comprising a coil spring disposed in longitudinal compression and coupled to an end of said member so that the longitudinal axis of said coil spring is nominally colinear with a longitudinal axis of said member as it is pivoted in said reciprocating motion, and means for selecting the compression force exerted upon said string for correspondingly altering the extent of pivotal motion of said member.

2. An electrical signal responsive printer for marking information characters represented by received electric signals on a predetermined surface as said printer is moved across such surface, said printer comprising a marking device, electromagnetic motor means for moving said device to trace a recurrent pattern in a plane parallel to the plane of said surface, said motor means including a rotary electric motor for driving said marking device in a circular pattern of movement, means, responsive to said received electric signals, for actuating said device into or out of marking engagement with said surface to interrupt selectable parts of successive markings of said pattern on said surface for thereby forming said characters, a hollow guide tube having first and second sections with approximately parallel longitudinal axes and having a dog-leg section joining said first and said second sections, a flexible shaft extending through said tube and coupled at one end to be driven back and forth therein by said actuating means, a tip being secured to a second end of said shaft which is fitted in an end of said second section of said tube to be longitudinally movable in such section without being significantly movable transversely with respect to such section, said rotary motor including an armature having an aperture therethrough along the axis of rotation thereof, and said first section of said tube being coupled to said armature to be driven in rotation thereby with a substantially colinear axis of rotation, said shaft extending from said tube through said armature to said actuating means.

3. The printer in accordance with claim 2 in which there are provided means coupled to said first section of said tube for producing indexing signals periodically indicating the angular position of said marking device as said first section rotates.

* * * * *

UNITED STATES PATENT AND TRADEMARK OFFICE
CERTIFICATE OF CORRECTION

PATENT NO. : 4,211,012

DATED : July 8, 1980

INVENTOR(S) : Harold G. Alles and Peter S. Kubik

It is certified that error appears in the above—identified patent and that said Letters Patent is hereby corrected as shown below:

In the title, "Electric-Signal Controlled" should read --Electric-Signal-Controlled--.

Column 5, line 55, "402" should read --420--.

Signed and Sealed this

*Eleventh* Day of *November 1980*

[SEAL]

*Attest:*

SIDNEY A. DIAMOND

*Attesting Officer* *Commissioner of Patents and Trademarks*